Sept. 2, 1969     M. HASTEN ET AL     3,464,086

EXTRUSION APPARATUS

Filed Nov. 25, 1966     4 Sheets-Sheet 1

INVENTORS
MARK HASTEN
FLOYD LOBASH

BY

ATTORNEY

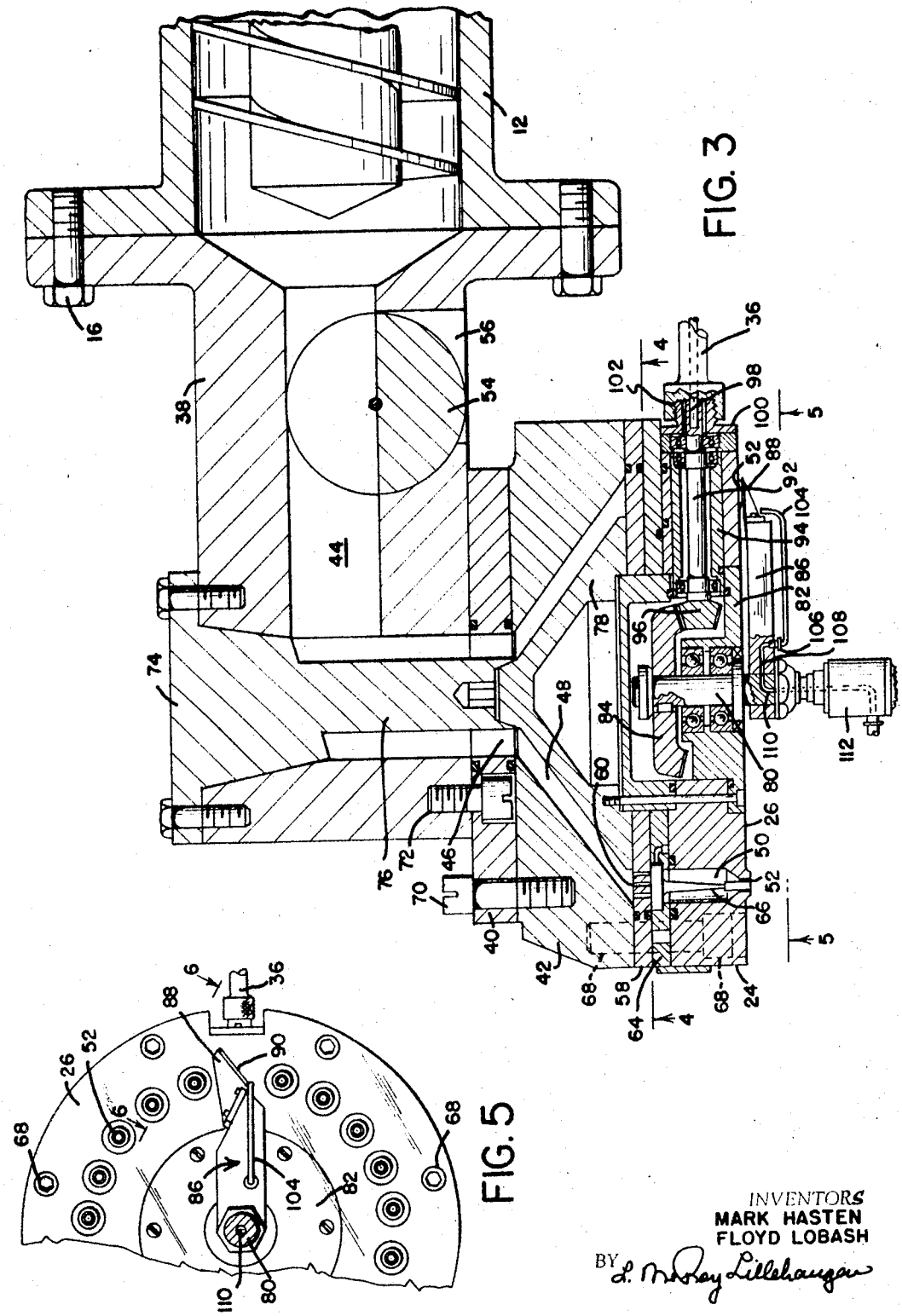

Sept. 2, 1969  M. HASTEN ET AL  3,464,086
EXTRUSION APPARATUS
Filed Nov. 25, 1966  4 Sheets-Sheet 3
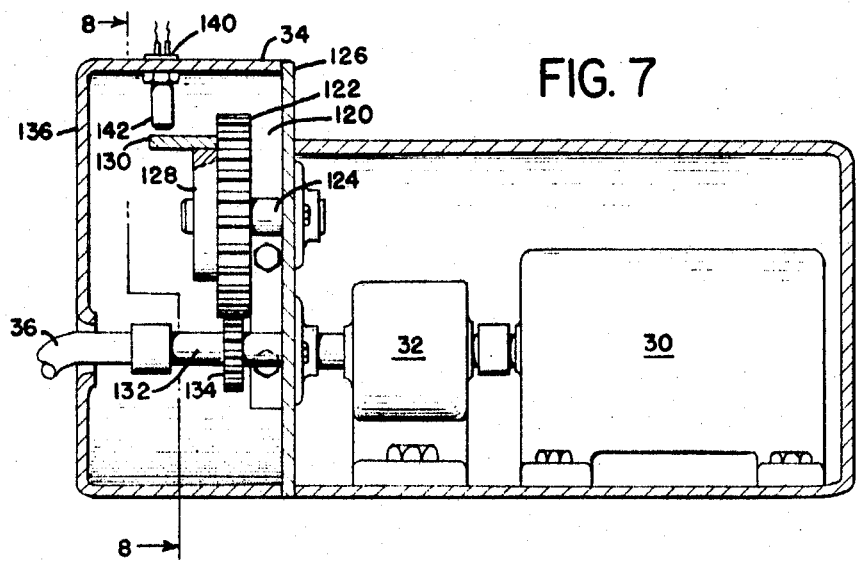
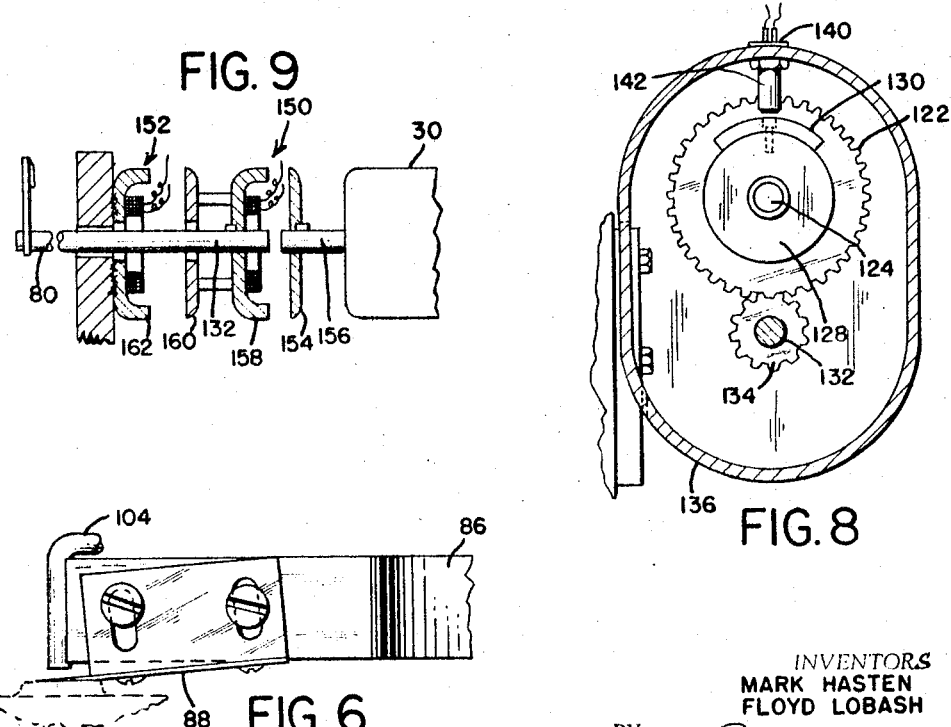
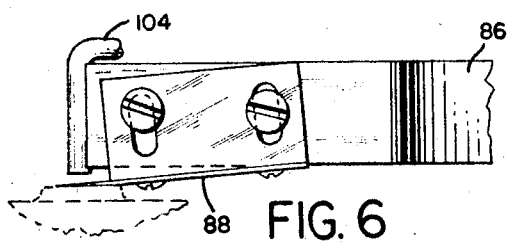
INVENTORS
MARK HASTEN
FLOYD LOBASH
BY
ATTORNEY

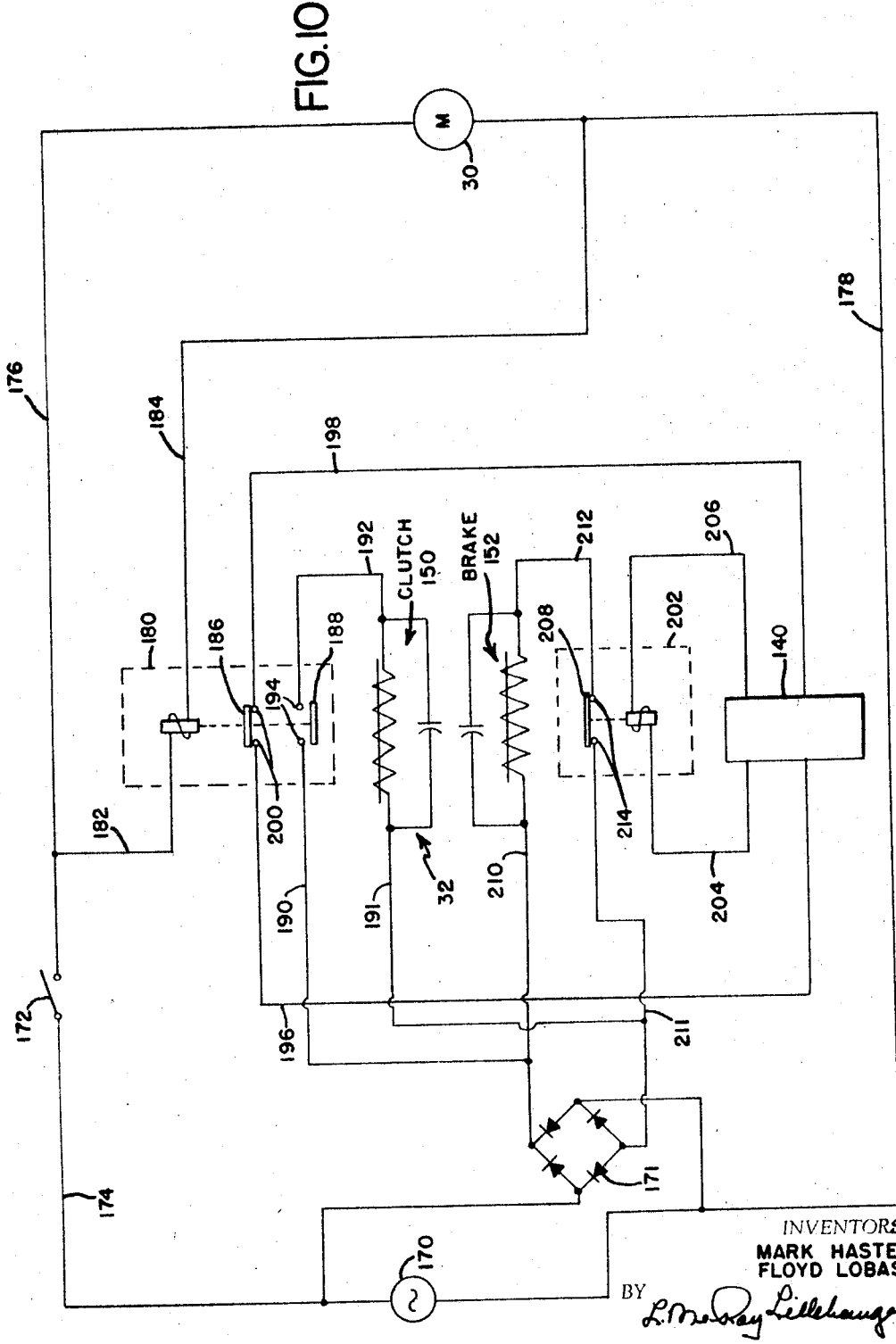

United States Patent Office 3,464,086
Patented Sept. 2, 1969

3,464,086
EXTRUSION APPARATUS
Mark Hasten and Floyd Lobash, Minneapolis, Minn., assignors to General Mills, Inc., a corporation of Delaware
Filed Nov. 25, 1966, Ser. No. 596,846
Int. Cl. B29f 3/04; B29c 17/14
U.S. Cl. 18—12                                10 Claims

ABSTRACT OF THE DISCLOSURE

An apparatus for slicing ropes of extruded material into predetermined lengths as the ropes are forced through extrusion orifices in an extrusion apparatus. A motor and clutch are provided for activating the slicing apparatus. A brake, a rotatable cam, and a cam sensing device are provided for stopping the slicing apparatus at a predetermined location, so that none of the orifices are blocked by the slicing apparatus.

---

The present invention relates to an extrusion apparatus for forming an extruded product or extrudate, and more specifically to an extrusion apparatus which includes an improved cutting mechanism for slicing the extruded product into segments of predetermined length.

Extrusion devices having a die with one or more nozzles or extrusion orifices therein, are well known in the art for forming extruded products. Such a die is positioned at the end of an extrusion cavity or chamber and as the material is forced through the orifices it is formed into a rope or extrudate having a cross-sectional shape determined by the size and shape of the orifice. One or more knives or blades are often used for cutting the extruded material as it is forced through the orifices, into predetermined lengths.

According to the known state of the art, the cutting knives are ofttimes rotatably mounted adjacent to the discharge end of the apparatus and when relative movement of the knife or blade with respect to the discharge end stops, it is sometimes positioned directly over one or more of the orifices, thus blocking the passage. This is a serious disadvantage because if part of the material is still within the cavity or within the nozzle or orifice, it may harden and block the passage, thus requiring cleaning of the equipment before it can be used in subsequent operations.

Accordingly, one object of the present invention is to provide an improved extrusion apparatus for forming segmented extruded products.

Another object is to provide an extrusion apparatus having an improved cutting mechainsm for cutting the extruded product into predetermined lengths.

A further object is to provide a device for cutting material discharged through an orifice, the device having improved means for controlling the position at which its relative movement stops.

Other objects and advantages will become apparent from a consideration of the following specification and accompanying drawings. Before proceeding with a detailed description of the invention however, a brief description of it will be presented.

Briefly, the extrusion apparatus includes a die head having a flow chamber therein. A die having a die face, forms a discharge end of the die head. A plurality of extrusion orifices are formed in the die so as to communicate with the flow chamber and they are positioned with respect to each other so that they define a circle in the die face. A cutting mechanism or knife is rotatably mounted in the die head so that it rotates about an axis normal to the die face, and it cuts or slices the extruded product or extrudate into segments of predetermined length. A control mechanism is provided for controlling the angular position at which the cutting blade stops so as to prevent the blade from being positioned over any of the orifices when the rotational movement of the blades stops.

The invention will best be understood with respect to the following drawings wherein:

FIG. 3 is an enlarged vertical sectional view of the die head taken along line 3—3 of FIGURE 1;

FIG. 5 is a reduced partial end view of the apparatus shown in FIG. 3, taken along line 5—5;

FIG. 6 is a partial view taken along line 6—6 of FIG. 5 illustrating the cutting mechanism;

FIG. 7 is a schematic sectional view illustrating the apparatus for imparting rotational movement to the cutting mechanism;

FIG. 8 is a partial sectional view taken along line 8—8 of FIG. 7;

FIG. 9 is a schematic view showing a clutch and brake assembly; and

FIG. 10 is a schematic view of the electrical system for operating the cutting mechanism.

Figure 1:
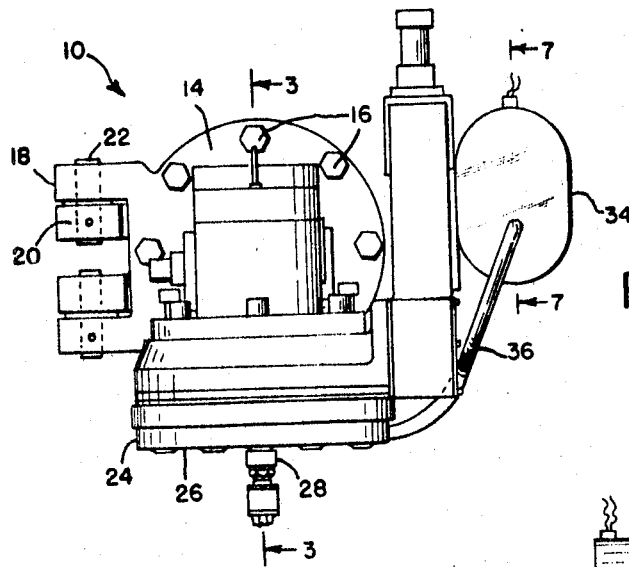
FIG. 1 is a front elevational view of an extrusion apparatus embodying the invention.
Figure 2:
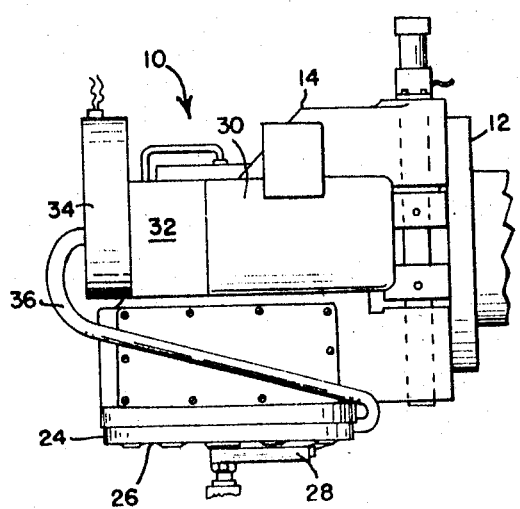
FIG. 2 is a partial side elevational view of the apparatus shown in FIGURE 1.

FIGURES 1 and 2 illustrate an extrusion apparatus designated generally by reference numeral 10. The apparatus includes an extruder 12 and a die head 14 attached to the end of the extruder 12 by means of bolts 16. As noted in FIGURE 1, the die head 14 is also pivotally connected to the extruder 12 by means of bosses 18 and 20, and shafts 22. By removing the bolts 16, the die head 14 can be pivoted about the shafts 22 away from the end of the extruder 12 so that cleaning of the extruder and the die head can be accomplished.

The die head 14 includes a die 24 having a die face 26. A cutting mechanism 28 is mounted with respect to the die face 26 so that it is rotatable about an axis normal to the die face. A variable speed motor 30 is operatively connected to the cutting mechanism for causing it to rotate. Interposed between the motor 30 and the cutting mechanism 28 is a clutch and brake assembly 32 and a cam housing 34. A flexible cable 36 operatively connects the cutting mechanism to the motor 30.

Figure 4:
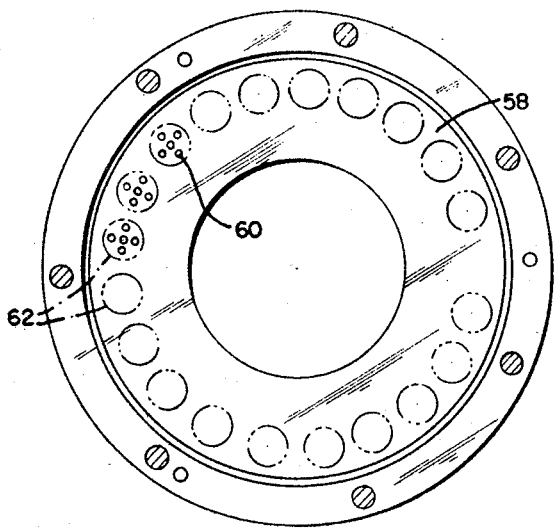
FIG. 4 is a reduced sectional view taken along 4—4 of FIG. 3.

FIG. 3 illustrates the die head 14 in greater detail. The die head includes a manifold 38, an adapter plate 40, a top die plate 42 and the bottom die or die plate 24. The manifold 38 is provided with an L-shaped passage 44 which is aligned at one end with the inside of the extruder 12; the adapter plate 40 has an opening or passage 46; the top die plate 42 is provided with a frusto-conically shaped passage 48; and the die 24 is provided with a plurality of cylindrically shaped chambers 50 having extrusion orifices 52. As noted in FIG. 5, the extrusion orifices 52 are positioned with respect to each other so that they define a circle on the die face 26. Moreover, as illustrated in FIG. 5, a larger space is provided between two of the orifices than between the rest of them. This feature will be described with further detail below. A diverter valve 54 is pivotally mounted in the manifold 38, and a passage 56 is formed in the manifold 38. When the valve 54 is pivoted 90° from that shown in FIG. 3, it blocks the flow of material through the passage 44 and causes it to flow through the passage 56. A breaker plate 58, having a plurality of small openings or passages 60 combined so as to form groups 62 (note FIG. 4), and an insert plate 64 for positioning a die pin 66 in each of the chambers 50, are interposed between the die plates 24 and 42. Appropriate means such as bolts 68, 70 and 72 are provided for maintaining the die head in an assembled condition.

It should be realized of course, that if desired the die head could be formed so that the die is in direct alignment with the extruder, i.e. the L-shaped passage 44 could be excluded. The disclosed arrangement permits the use of a horizontally oriented extruder, and the discharge of the extrudate along a vertical axis.

A mandrel 74 having a shank 76, is attached to the manifold 38 so that the shank projects into the the L-shaped passage 44 so as to form an annular passage. A distribution cone 78 is attached to the end of the shank 76, and it is positioned within the frusto-conically shaped passage 48 so as to form a second annular passage which flares outwardly. The larger diameter of the flared passage 48 is such that it forms a circle having substantially the same diameter as the diameter of the groups of passages 62 formed in the breaker plate 58.

A shaft 80 is rotatably mounted within a housing plate 82 which is secured to the die head 14 by appropriate means. A gear 84 is keyed to one end of the shaft 80, and an arm member 86 is keyed proximate the other end of the shaft. The longitudinal axis of the shaft 80 is normal to the die face 26, and the shaft is centrally located with respect to the orifices 52. A knife or blade 88 having a cutting edge 90, is removably attached to the arm member 86 at a radial distance from the shaft axis so that as the shaft rotates, the knife defines a circular path which passes by the circularly oriented orifices 52. As shown in FIG. 5, the knife 88 is positioned so that it is at a point between two of the orifices when rotational movement of the shaft 88 stops. As noted hereinbefore, this space is larger than the space between the other orifices; it therefore provides a location at which the blade can be positioned when the cutting action is stopped so that it is not positioned directly over any of the orifices.

A second shaft 92 is rotatably within a housing 94 positioned within the die head in such a manner that the longitudinal axis of the shaft 92 is perpendicular to the axis of shaft 80. A pinion gear 96 is attached to one end of the shaft 92 so that it meshes with the gear 84. The other end of the shaft 92 is provided with a square-shaped cavity 98. An end plate 100 having a threaded portion 102, is attached to the housing 94. The flexible cable 36 is connected to the threaded portion 102, and it has a square-shaped end piece which is inserted within the cavity 98. Rotational movement is imparted to the shaft 92 which in turn imparts rotational movement to the cutting mechanism about the shaft 80.

A gaseous medium, such as air, is directed against the cutting edge of the knife by means of a conduit 104 which is attached to the arm member 96 by an elbow 106. As noted in FIG. 3, the arm is provided with a passage 108 which mates with a passage 110 formed in the shaft 80. An air union 112 is connected to the shaft 80 by appropriate means, and it is connected to an air source (not shown). Air flows through the union, the passages, and the conduit 104 so that it is discharged adjacent to the knife edge thereby aiding in preventing the extruded product from sticking to the surface of the knife.

The mechanism for controlling the position at which the cutting mechanism stops includes a cam mechanism designated generally by reference numeral 120, which is positioned within the cam housing 34. The cam mechanism aids in assuring that the cutting arm 86 and blade 88 stop at a predetermined position when the cutting action is stopped; in other words, the blade 88 is prevented from being positioned over any of the orifices 52 so as to block them. The mechanism 120 includes a gear 122 attached to a shaft 124 which is rotatably mounted in a mounting plate 126. A circular plate 128 is secured to the face of the gear 122 and a cam or curved shoe 130 is secured to the edge of the plate. A second shaft 132 is also rotatably mounted in the plate 126 and it has affixed thereto a gear or pinion 134 which meshes with the gear 122. The flexible shaft 36 is attached to the end of the shaft 132. A cover 136 encloses the cam mechanism 120 and it is attached to the mounting plate by appropriate means. The gear 122 and the plate 128 should be formed of a non-ferrous material, such as fibrous or plastic material; the cam 130 however, should be formed of a ferrous material. Furthermore, if preferred, the gear 134 might also be of a non-ferrous material.

A proximity switch sensor 140 is attached to the upper portion of the cover 136 so that it is proximately positioned relative to the cam 130 when the cam and gear 122 are in the position shown in FIGS. 7 and 8. The sensor includes a detection head 142, and it is electrically connected to the clutch and brake assembly 32. When the sensor 140 is energized, a magnetic field is established between the end piece 142 and the cam 130, and a signal is transmitted to the clutch and brake assembly 32. Sensors of this type are well known in the art, and will not therefore, be described in detail. One type which is commercially available and which has been used with satisfactory results is Model No. 6FS1, manufactured by Honeywell, Inc. of Minneapolis, Minn.

The ratio of gear 84 to gear 96 is the same as the ratio of gear 122 to gear 134; therefore, the rotational velocity of the shaft 80 and arm 86 is the same as the rotational velocity of the shaft 124 and cam 130. The gears can thus be arranged so that when the cam 130 is positioned adjacent to the sensor 140, as shown in FIG. 7, the cutting mechanism 28 will be in the position shown in FIG. 5, i.e., the blade 88 is positioned so that it does not block any of the orifices.

A number of clutch and brake assemblies 32 are commercially available which might be used with satisfactory results. One type which has been satisfactorily used is Model EM50–12, manufactured by Warner Electric Brake and Clutch Company of Beloit, Wis. As illustrated schematically in FIG. 9, the assembly includes a clutch 150 and a brake 152. The clutch 150 includes a disk 154 which is fixedly attached to the output shaft 156 of the motor 30, and an electromagnet 158 which is fixedly connected to the shaft 132. The brake 152 includes a disk 160 which is attached to the magnet 158, and an electromagnet 162 which is fixedly connected to the frame 164 of the assembly housing. The operation of such devices is well known to those skilled in the art; briefly, by energizing the electromagnet 158 when the motor 30 is in operation, rotational movement is imparted to the shaft 132 and consequently the shaft 80 to which the cutting mechanism is attached. By de-energizing the magnet 158 and energizing the electromagnet 162, rotational movement of the shaft 132 can be abruptly stopped.

The cutting mechanism is controlled through the electrical system schematically illustrated in FIG. 10. Briefly, the system includes an electric power source 170, the motor 30, the clutch and brake assembly 32, and the proximity switch sensor 140. A normally open control switch 172 is connected by lead 174 to the power source 170, and when closed completes the circuit to the motor 30 through leads 176 and 178. A relay 180 is electrically connected to the leads 176 and 178 by leads 182 and 184 respectively, and it includes a pair of movable contacts 186 and 188. The relay 180 is electrically connected to the clutch 150 and a D.C. power source 171 by leads 190, 191 and 192 through contact points 194, and to the proximity switch sensor 140 by leads 196–198 through contact points 200. A second relay 202 is electrically connected to the sensor 140 by leads 204 and 206, and it includes a movable contact 208. The relay 202 is electrically connected to the brake 152 and the D.C. power source 171 by leads 210, 211 and 212 through contact points 214.

When the switch 172 is in the open position as shown in FIG. 10, the motor 30 and cutting mechanism 28 are stopped. By closing the switch 172, the motor 30 and the relay 180 are energized. When the relay 180 is energized, the contact 188 becomes positioned across the contact points 194, thus completing the circuit between the D.C. power source 171 and the clutch 150 and establishing a magnetic field between the magnet 158 and the disk 154 (note FIG. 9), thereby causing the shaft 132 to rotate. Simultaneously, the contact 186 moves away from the contact points 200, thereby de-energizing the sensor 140 and the relay 202. De-energization of the relay 202 causes the contact 208 to move away from the contact points 214, thereby de-energizing the brake 152.

To stop the motor 30 and cutting mechanism 28, the switch 172 is opened thereby de-energizing the motor and the relay 180. The contact 188 moves away from the contact points 194, thus breaking the circuit between the D.C. power source 171 and the clutch 150, while the contact 186 moves into contact with the contact points 200, thus energizing the proximity switch sensor 140. The sensor 140 senses the cam 130 as it rotates about the shaft 124. When the sensor 140 senses that the cam 130 is in its predetermined stop position, the sensor energizes the relay 202. When the relay 202 is so energized, the contact 208 moves into contact with the contact points 214 of the relay 202, thus energizing the brake 152 which causes a magnetic field to be established between the magnet 162 and the disk 160; the magnetic field causes shafts 132 and 80 to stop rotating. The shaft 124 stops so that the cam 130 is proximate the head 142, and the arm 86 and knife 88 stop at the open space in the die face as shown in FIG. 5.

If preferred, one or both of the relays used might be time delay relays. For example, by using a time delay relay in lieu of the relay 180, it might be adjusted so that the control 30 is de-energized a few seconds, or fractional parts of a second, before the clutch is de-energized. Thus, the motor begins to decelerate before the clutch 150 is de-energized and the shaft 132 stops rotating. In a like manner, a few seconds might elapse before the proximity switch sensor 140 is energized, after the clutch has been de-energized. The use of such relays is well known in the art and will not be described in further detail. Moreover, if desired an additional relay might be included which is set so that it releases the entire system, including the brake 152, a few seconds after the operation has stopped, so that the components might be freely rotated.

The overall operation of the apparatus should be quite clear to those skilled in the art. As the material is forced through the extruder 12 into the passage 44 in the die head, it flows through the annular passages 46 and 48, the chambers 50, and through the orifices 52. By energizing the motor 30, as described above, the cutting mechanism is caused to rotate clockwise about the axis of shaft 80 at a predetermined rate. As the arm 86 rotates, the knife 88 defines a circular path which passes by the circularly oriented orifices 52 and it slices the extrudate as it is discharged from each orifice into segments of predetermined length. The length of the extruded product can be controlled by increasing or decreasing the relative speed of rotation of the cutting mechanism. In this regard, the speed should not be so great that the sliced segments are caused to impinge against each other. Moreover, the relative spacing between the orifices 52 should be such that the segments do not impinge or fall against each other.

By including a control mechanism similar to that described above, the relative stopping position of the arm member 86 and the knife 88 can be controlled so that they stop at a point which is not positioned over one or more of the orifices. The present invention assures that the passages formed in the die face will not become blocked when the operation of the apparatus is stopped.

In the above description and attached drawings, a disclosure of the principles of this invention is presented, together with some of the embodiments by which the invention may be carried out.

We claim:
1. An extrusion apparatus having an extrusion flow chamber and more than one spaced apart extrusion orifice, means for forcing material through said chamber and said orifices thereby forming extrudates, a cutting mechanism for slicing said extrudates as they are discharged through the orifices, means for movably mounting said cutting mechanism with respect to the flow chamber and the orifices so that said cutting mechanism passes by the orifices thereby slicing the extrudates, means for imparting relative movement between said orifices and said cutting mechanism, and control means for causing said mechanism to stop at a single predetermined location between said spaced apart orifices so as to not be positioned over any of the orifices when said relative movement stops.

2. An extrusion apparatus having an extrusion flow chamber and a plurality of extrusion orifices, said orifices being positioned with respect to each other so that they are equidistantly spaced about a common point, means for forcing material through said chamber and said orifice thereby forming an extrudate, a cutting mechanism for slicing said extrudate as it is discharged through the orifice, means for movably mounting said cutting mechanism with respect to the flow chamber and the orifice so that said cutting mechanism passes by the orifice thereby slicing the extrudate, means for imparting relative movement between said orifice and said cutting mechanism, and control means for causing said mechanism to stop at a predetermined location so as to not be positioned over the orifice when said relative movement stops, said predetermined location being positioned at a single location between two adjacent orifices.

3. An extrusion apparatus having an extrusion flow chamber and at least one extrusion orifice, means for forcing material through said chamber and said orifice thereby forming an extrudate, a cutting mechanism for slicing said extrudate as it is discharged through the orifice, said cutting mechanism including an arm member and at least one cutting blade attached to said arm member, means for movably mounting said cutting mechanism with respect to the flow chamber and the orifice so that said cutting mechanism passes by the orifice thereby slicing the extrudate, means for imparting relative movement between said orifice and said cutting mechanism, conduit means for directing a gaseous medium against the cutting blade, said conduit means being attached to said arm member, and control means for causing said mechanism to stop at a predetermined location so as to not be positioned over the orifice when said relative movement stops.

4. An apparatus for forming segmented extruded products comprising a die having a die face and a plurality of orifices circularly oriented about an axial normal to the die face, a cutting mechanism rotatably mounted in said die about an axis normal to said die face, said mechanism including an arm and a knife secured to said arm, motor means for rotating said cutting mechanism, a clutch and brake assembly operatively connected to said motor means and said cutting mechanism, means for energizing the clutch, said clutch when energized causing the cutting mechanism to rotate, means for energizing the brake, said brake when energized causing the cutting mechanism to stop rotating, said brake being de-energized when the clutch is energized and said clutch being de-energized when the brake is energized, means for causing the cutting mechanism to stop at a predetermined location so that the arm and knife are not positioned over any of the orifices, said means including a cam member mounted for rotational movement about an axis, and a sensing mechanism which senses the position of said cam member at a predetermined stop position and transmits a signal to the brake thereby energizing it.

5. The combination of claim 2 wherein the orifices are positioned with respect to each other so that they define a circle, and means are provided for rotatably mounting the cutting mechanism at said common point so that as the mechanism is caused to rotate it passes consecutively by the orifices thereby defining a circular path as it rotates about said axis.

6. The combination of claim 5 wherein motor means is provided for imparting rotational movement to the cutting mechanism, and the control means includes a clutch and brake assembly interposed between the motor means and the cutting mechanism, the clutch portion of said assembly when energized causing the cutting mechanism to rotate, and the brake portion of said assembly when energized causing the cutting mechanism to stop rotating.

7. The combination of claim 6 which includes a cam mechanism which is mounted for rotational movement about an axis and sensing means which when energized senses the position of said cam member and transmits a signal to the brake portion of the clutch and brake assembly.

8. The combination of claim 7 wherein the cam member is operatively connected to the cutting mechanism so that the angular position of said cutting mechanism about said axis can be related to the angular position of the cutting mechanism.

9. The combination of claim 7 wherein means is provided for energizing the clutch when the motor means is energized, means is provided for energizing the sensing means after the clutch has been de-energized, and means is provided for energizing the brake after the sensing means has been energized and the cam mechanism is located at a predetermined position.

10. An apparatus for forming segmented extruded products comprising a die having a die face and a plurality of spaced apart orifices circularly oriented about an axis normal to the die face, a cutting mechanism rotatably mounted in said die about an axis normal to said die face, said mechanism including an arm and a knife secured to said arm, motor means for rotating said cutting mechanism, a clutch and brake assembly operatively connected to said motor means and said cutting mechanism, means for energizing the clutch, said clutch when energized causing the cutting mechanism to rotate, means for energizing the brake, said brake when energized causing the cutting mechanism to stop rotating, said brake being de-energized when the clutch is energized and said clutch being de-energized when the brake is energized, and means for causing the cutting mechanism to stop at a predetermined location between the orifices so that the arm and knife are not positioned over any of the orifices.

References Cited

UNITED STATES PATENTS

| | | |
|---|---|---|
| 2,401,236 | 5/1946 | Fielitz. |
| 2,436,201 | 2/1948 | Cole. |
| 2,614,290 | 10/1952 | Street. |
| 2,622,273 | 12/1952 | Detwiler. |
| 2,651,827 | 9/1953 | Oswalt. |
| 2,871,516 | 3/1959 | Sherman et al. |
| 3,029,471 | 4/1962 | Adams et al. |
| 3,143,766 | 8/1964 | Rohn. |

WILLIAM J. STEPHENSON, Primary Examiner